(12) United States Patent
Kim et al.

(10) Patent No.: US 7,821,907 B2
(45) Date of Patent: Oct. 26, 2010

(54) APPARATUS AND METHOD FOR REPRODUCING OPTICAL DISK

(75) Inventors: In-joo Kim, Suwon-si (KR); Tatsuhiro Otsuka, Suwon-si (KR); An-sik Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 11/947,055

(22) Filed: Nov. 29, 2007

(65) Prior Publication Data

US 2008/0186815 A1     Aug. 7, 2008

(30) Foreign Application Priority Data

Feb. 1, 2007     (KR)     ............... 10-2007-0010678

(51) Int. Cl.
    *G11B 7/00*     (2006.01)
(52) U.S. Cl. ............................. 369/124.01; 369/47.16; 369/53.2
(58) Field of Classification Search ............ 369/124.01, 369/124.13, 124.12, 124.11, 124.1, 53.2, 369/53.41, 47.15, 47.16
    See application file for complete search history.

(56) References Cited

U.S. PATENT DOCUMENTS

| | | | |
|---|---|---|---|
| 5,506,825 A * | 4/1996 | Gushima et al. | 386/96 |
| 5,684,651 A | 11/1997 | Yaegashi et al. | |
| 5,684,774 A * | 11/1997 | Yamamuro | 369/47.28 |
| 5,848,036 A * | 12/1998 | Ishibashi et al. | 369/44.29 |
| 6,680,887 B2 * | 1/2004 | Shihara et al. | 369/44.32 |
| 7,154,827 B2 * | 12/2006 | Tokita et al. | 369/47.53 |
| 2003/0043710 A1 * | 3/2003 | Shelton et al. | 369/44.34 |
| 2005/0276193 A1 | 12/2005 | Kamimori | |

FOREIGN PATENT DOCUMENTS

| | | |
|---|---|---|
| JP | 6-275014 | 9/1994 |
| JP | 2002-298506 | 10/2002 |

OTHER PUBLICATIONS

International Search Report and Written Opinion issued in corresponding International Application No. PCT/KR2008/000409 dated Apr. 24, 2008.

* cited by examiner

*Primary Examiner*—Tan X Dinh
(74) *Attorney, Agent, or Firm*—NSIP Law

(57) ABSTRACT

An optical disk reproducing apparatus to equalize and reproduce a signal optically read from an optical disk includes a controller to determine a number of regions to divide the optical disk into according to a reproduction frequency variation corresponding to a signal quality variation, and an equalizer to filter signals optically read from the divided regions with a cut-off frequency corresponding to the reproduction frequency variation.

38 Claims, 5 Drawing Sheets

APPARATUS AND METHOD FOR REPRODUCING OPTICAL DISK

CROSS-REFERENCE TO RELATED APPLICATION

This application claims the benefit of Korean Application No. 2007-10678, filed Feb. 1, 2007 in the Korean Intellectual Property Office, the disclosure of which is incorporated herein by reference.

BACKGROUND OF THE INVENTION

1. Field of the Invention

Aspects of the present invention relate to an apparatus and method for reproducing an optical disk.

2. Description of the Related Art

FIG. 1 illustrates a block diagram of a conventional optical disk reproducing apparatus 100. Referring to FIG. 1, when data recorded on an optical disk 10 is reproduced, a pick-up 110 receives the data and a signal converter 120 converts the data into an electric signal in the form of a radio frequency (RF) signal. An amplifier 130 removes noise from the RF signal and amplifies the RF signal according to a disk access time. The properties of the data recorded on the optical disk 10 vary according to various factors, and thus the RF signal may deviate from a normal level and become distorted. To solve this problem, an equalizer 140 filters the distorted RF signal. To filter the distorted RF signal, a controller 150 determines an appropriate cut-off frequency at which to filter the RF signal and transmits the cut-off frequency to the equalizer 140.

The quality of a reproduced RF signal varies according to the position on the optical disk 10 from which the RF signal is reproduced. However, it is difficult for the conventional optical disk reproducing apparatus 100 to accurately filter an RF signal of various types of optical disks having various signal qualities. Furthermore, the measurement of signal quality requires an additional system load on the conventional optical disk reproducing apparatus 100, resulting in an increase in system complexity and power consumption.

SUMMARY OF THE INVENTION

Aspects of the present invention provide an optical disk reproducing apparatus and method to efficiently filter a signal according to signal quality.

Aspects of the present invention also provide an optical disk reproducing apparatus and method to perform a suitable filtering operation to prevent signal quality variation and signal deterioration.

According to an aspect of the present invention, an optical disk reproducing apparatus to equalize and to reproduce signals optically read from an optical disk, including a controller to determine a number of regions to divide the optical disk into according to a reproduction frequency variation corresponding to a restricted signal quality variation rate, and an equalizer to filter signals optically read from the divided regions using a cut-off frequency corresponding to the reproduction frequency variation.

According to an aspect of the present invention, the controller includes a signal quality detection unit to detect signal quality variation according to the reproduction frequency variation of the optical disk, and a region determination unit to receive the restricted signal quality variation rate which is transmitted from an external device and to determine the number of regions to divide the optical disk into according to the reproduction frequency variation corresponding to the restricted signal quality variation rate.

According to an aspect of the present invention, the signal quality detection unit detects a plurality of the signal quality variations respectively corresponding to a plurality of the reproduction frequency variations to obtain a polynomial expression with respect to the plurality of the signal quality variations corresponding to the plurality of the reproduction frequency variations.

According to an aspect of the present invention, the signal quality detection unit detects the signal quality variations respectively corresponding to N+1 of the reproduction frequency variations to obtain an N-order polynomial expression with respect to the signal quality variations corresponding to the reproduction frequency variations.

According to an aspect of the present invention, the signal quality detection unit detects the signal quality variations corresponding to the reproduction frequency variations by changing a signal reproducing point on the optical disk.

According to an aspect of the present invention, the signal quality detection unit detects the signal quality variations corresponding to the reproduction frequency variations by changing revolutions per minute (RPM) of a motor which rotates the optical disk.

According to an aspect of the present invention, the signal quality detection unit detects jitter according to the reproduction frequency variation of the optical disk.

According to an aspect of the present invention, the signal quality detection unit detects a bit error rate according to the reproduction frequency variation of the optical disk.

According to an aspect of the present invention, a variation in the jitter detected by the signal quality detection unit is proportional to the reproduction frequency variation of the optical disk.

According to an aspect of the present invention, the region determination unit determines the number of regions using the following equation.

$$n = \frac{\log a}{\log(1 + f)}$$

where n represents the number of regions, a represents a difference between reproduction frequencies at an innermost region and an outermost region of the optical disk, and f represents the reproduction frequency variation corresponding to the restricted signal quality variation rate, wherein f is determined using the polynomial expression.

According to an aspect of the present invention, the region determination unit determines the number of divided regions of the optical disk and positions of boundaries of the divided regions.

According to an aspect of the present invention, the controller further includes a determination unit to determine whether the regions of the optical disk should be newly determined, and the signal quality detection unit and the region determination unit are operated according to the determination by the determination unit.

According to an aspect of the present invention, the cut-off frequency corresponding to the reproduction frequency variation has different values corresponding to the regions of the optical disk.

According to an aspect of the present invention, the cut-off frequency corresponding to the reproduction frequency variation has a same value for the regions having similar reproduction frequency variations from among the regions of the optical disk.

According to an aspect of the present invention, the regions having the similar reproduction frequency variations do not border each other.

According to an aspect of the present invention, the equalizer low-pass-filters the signals According to another aspect of the present invention, an optical disk reproducing method to equalize and reproduce a signal optically picked up from an optical disk includes determining a number of regions to divide the optical disk into based on a reproduction frequency variation corresponding to a restricted signal quality variation rate, and filtering signals optically read from the divided regions using a cut-off frequency corresponding to the restricted reproduction frequency variation rate.

According to another aspect of the present invention, the optical disk reproducing method further includes detecting signal quality variation according to the reproduction frequency variation of the optical disk before the determining of the number of divided regions of the optical disk.

According to another aspect of the present invention, the detecting of the signal quality includes detecting a plurality of the signal quality variations respectively corresponding to a plurality of the reproduction frequency variations to obtain a polynomial expression with respect to the signal quality variations corresponding to the reproduction frequency variations.

According to another aspect of the present invention, the detecting of the signal quality variation includes detecting the signal quality variations respectively corresponding to N+1 of the reproduction frequency variations to obtain an N-order polynomial expression with respect to the signal quality variations corresponding to the reproduction frequency variations.

According to another aspect of the present invention, the detecting of the signal quality includes detecting the signal quality variations corresponding to the reproduction frequency variations by changing a signal reproducing point on the optical disk.

According to another aspect of the present invention, the detecting of the signal quality includes detecting the signal quality variations corresponding to the reproduction frequency variations by changing revolutions per minute (RPM) of a motor which rotates the optical disk.

According to another aspect of the present invention, the detecting of the signal quality includes detecting jitter or a bit error rate according to the reproduction frequency variation of the optical disk.

According to another aspect of the present invention, a variation in the detected jitter is proportional to the reproduction frequency variation of the optical disk.

According to another aspect of the present invention, the determining of the number of divided regions of the optical disk includes determining the number of regions using the following equation.

$$n = \frac{\log a}{\log(1+f)}$$

where n represents the number of regions, a represents a difference between reproduction frequencies at an innermost region and an outermost region of the optical disk, and f represents the reproduction frequency variation corresponding to the restricted signal quality variation rate, wherein f is determined using the polynomial expression.

According to another aspect of the present invention, the determining of the number of divided regions includes determining the number of divided regions of the optical disk and positions of boundaries of the divided regions.

According to another aspect of the present invention, the optical disk reproducing method further includes determining whether new regions of the optical disk from which signals are read and filtered with different cut-off frequencies should be determined, and performing the detecting of the signal quality variation and the determining of the number of divided regions according to the determining of whether the new regions should be determined.

According to another aspect of the present invention, the cut-off frequency corresponding to the reproduction frequency deviation has different values corresponding to the divided regions of the optical disk.

According to another aspect of the present invention, the cut-off frequency corresponding to the reproduction frequency variation has a same value for divided regions having similar reproduction frequency variations from among the divided regions of the optical disk.

According to another aspect of the present invention, the regions having similar reproduction frequency variations do not border each other.

According to another aspect of the present invention, the filtering of signals includes low-pass-filtering the signals.

According to another aspect of the present invention, a computer readable recording medium encoded with a computer readable program with processing instructions for executing an optical disk reproducing method to equalize and to reproduce a signal optically read from the optical disk includes determining a number of regions to divide the optical disk into according to a reproduction frequency variation corresponding to a restricted signal quality variation rate, and filtering signals optically read from the divided regions using a cut-off frequency corresponding to the reproduction frequency variation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
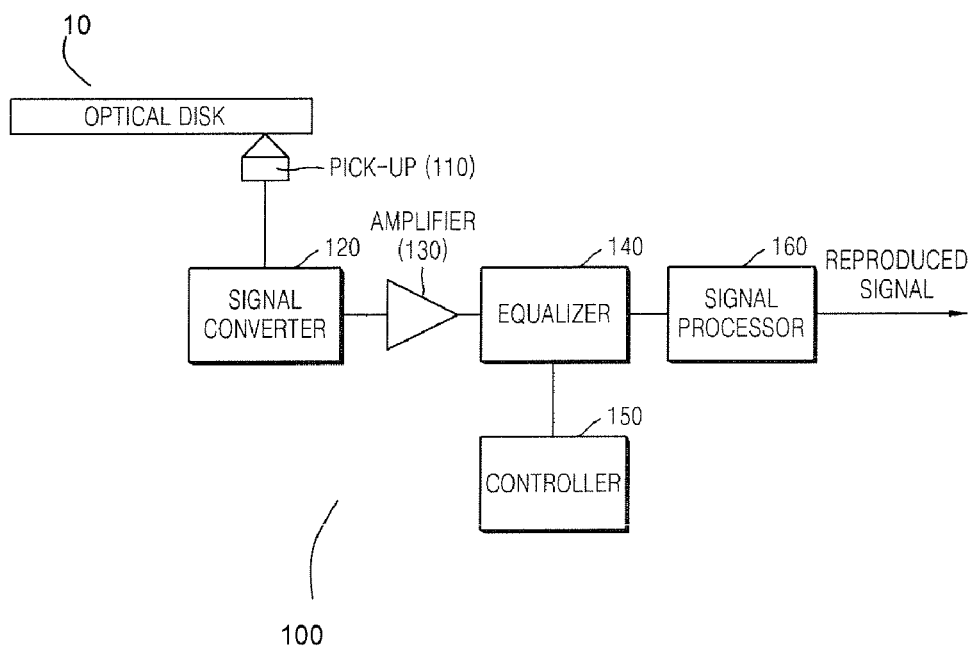
FIG. 1 is a block diagram of a conventional optical disk reproducing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
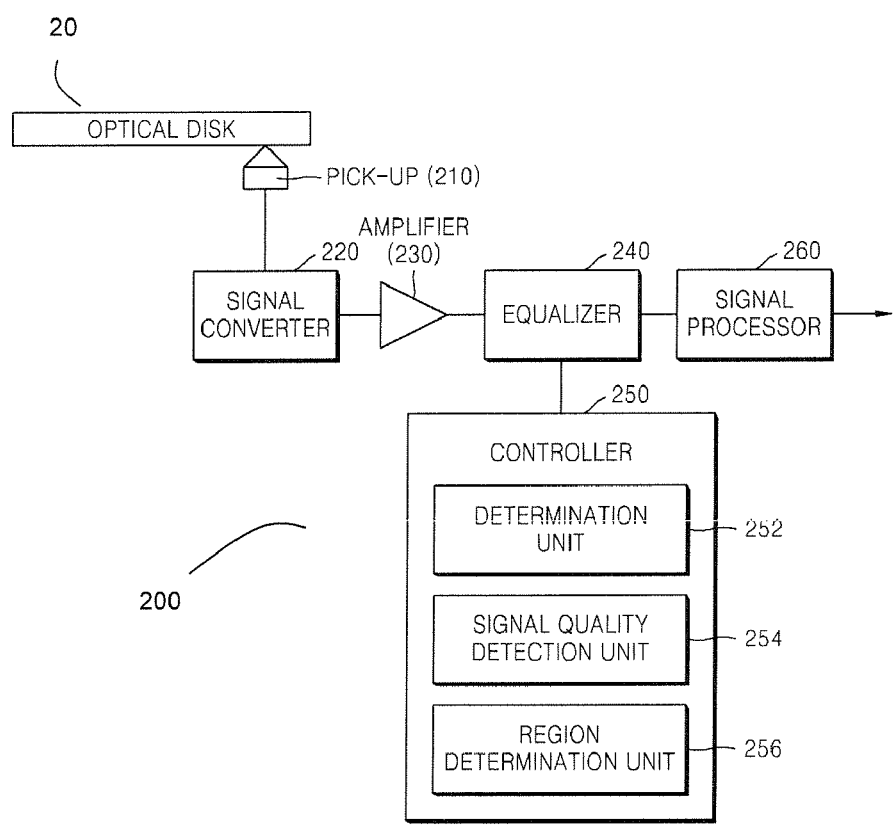
FIG. 2 is a block diagram of an optical disk reproducing apparatus according to an embodiment of the present invention.

FIG. 2 is a block diagram of an optical disk reproducing apparatus 200 according to an embodiment of the present invention. Referring to FIG. 2, the optical disk reproducing apparatus 200 includes a pick-up 210, a signal converter 220, an amplifier 230, an equalizer 240, a controller 250, and a signal processor 260. The controller 250 includes a determination unit 252, a signal quality detection unit 254, and a region determination unit 256. It is understood that the optical disk reproducing apparatus 200 may have other components in addition to those shown in FIG. 2 and described above, such as a disk drive, volume controls, etc. It is further understood that the optical disk reproducing apparatus 200 may be a component within a recording and reproducing apparatus which both records data to and reproduces data from the optical disk 20.

The pick-up 210 irradiates a laser beam to the surface of an optical disk 20 and receives a signal reflected from the surface of the optical disk 20 to record and/or reproduce data to and/or from the optical disk 20. The signal converter 220 converts the signal picked up by the pick-up 210 into an RF signal. The amplifier 230 amplifies the RF signal.

The determination unit 252 of the controller 250 determines whether the optical disk 20 is new. If the determination unit 252 determines that the optical disk 20 is new, the determination unit determines that the optical disk 20 should be divided into regions. The number of the divided regions and the positions of the boundaries of the regions are varied according to the quality of a reproduced signal. Thus, the determination unit 252 determines whether the regions of the optical disk 20 have already been set, and if not, the determination unit 252 determines that the optical disk 20 is new and should be divided into regions.

The signal quality detection unit 254 detects signal quality according to a reproduction frequency variation of the optical disk 20. To achieve this, the signal quality detection unit 254 measures the signal quality while changing the reproduction frequency variation. The signal quality detection unit 254 changes the reproduction frequency variation using various methods, such as by using a method of changing a reproducing point on the optical disk 20, or a method of controlling a motor speed. For example, the signal quality may be measured while the signal quality detection unit 254 changes the RPM (Revolutions per minute) of a spindle motor (not shown), which rotates the optical disk 20 to increase or decrease by a predetermined rotational speed at predetermined intervals while the pick-up 210 irradiates a constant frequency of light to the optical disk 20.

The signal quality detection unit 254 determines signal quality using various factors, such as, for example, jitter and a bit error rate (BER). An N-order polynomial expression for the reproduction frequency variation and the signal quality variation is derived according to the measured signal quality. To obtain the N-order polynomial expression, the signal quality detection unit 254 measures signal quality variation values with respect to N+1 reproduction frequency variations. A reproduction frequency variation corresponding to a signal quality variation currently to be maintained in the optical disk reproducing apparatus 200 is obtained according to the N-order polynomial expression.

The region determination unit 256 receives a signal quality variation required to be restricted which is transmitted from the optical disk reproducing apparatus 200 or an external device, and determines a number of regions the optical disk 20 should be divided into according to a reproduction frequency variation corresponding to the signal quality variation. The equalizer 240 performs a filtering operation with a cut-off frequency corresponding to the reproduction frequency variation for each of the divided regions of the optical disk 20.

For example, when a difference between the reproduction frequencies at the innermost region and the outermost region of the optical disk 20 is a, the number of regions which the cut-off frequency of the equalizer 240 is set to is n, the reproduction frequency of the innermost region is x, and the reproduction frequency variation obtained from the polynomial expression is f, the following equation can be used:

$$(1+f)^n x = ax \qquad \text{[Equation 1]}$$

Accordingly, the number of regions n is as follows:

$$n = \frac{\log a}{\log(1+f)} \qquad \text{[Equation 2]}$$

The frequencies at the boundaries of the regions are obtained and the positions of the boundaries are detected using the number of regions n and the reproduction frequency variation f. The frequencies at the boundaries of the regions and the positions of the boundaries are represented in Table 1. The region corresponding to a region number N is the last region. This last region does not require boundary reproduction frequency and position information.

TABLE 1

| Region number | Boundary reproduction frequency | Position | Cut-off frequency |
|---|---|---|---|
| 1 | $(1+f)x$ | P_1 | F_1 |
| 2 | $(1+f)^2 x$ | P_2 | F_2 |
| ... | ... | P_3 | F_3 |
| n−1 | $(1+f)^{n-1} x$ | P_n−1 | F_n−1 |
| N | | | F−n |

The signal quality detection unit 254 and the region determination unit 256 derive the values represented in Table 1. These values can be changed according to a signal quality variation required to be restricted and transmitted from the optical disk reproducing apparatus 200 or an external device such as a computer connected to the reproducing apparatus 200. Thus, the values vary when the restricted signal quality variation increases or decreases. However, when the restricted signal quality variation is changed in the same system or the same type of disk, the values can be directly updated according to the table or the polynomial expression without measuring signal quality again.

The equalizer 240 filters signals read from the multiple regions using the cut-off frequencies shown in Table 1 corresponding to reproduction frequency variations with respect to the respective regions. In other words, the equalizer 240 filters the signals with cut-off frequencies which are different for the respective regions. At the boundary of neighboring regions, the equalizer 240 changes the cut-off frequency corresponding to the previous region to the cut-off frequency corresponding to the following region and performs a filtering operation on the following region. Accordingly, a signal of uniform quality is reproduced. In general, the equalizer 240 performs low pass filtering. However, it is understood that the equalizer 240 is not limited to performing low pass filtering, and may instead perform another type of filtering, such as high-pass filtering, etc.

The cut-off frequencies corresponding to the reproduction frequency variations generally have different values at the respective regions, except that the cut-off frequencies have the same value at regions having similar reproduction frequency variations. For example, when non-neighboring regions, or regions which do not border each other, have the same reproduction frequency variation, the same cut-off frequency is used to filter signals picked up from the non-neighboring regions.

The signal processor 260 demodulates and error-corrects the RF signals filtered by the equalizer 240 to generate digital data. This data may be embodied as audio files, video files, or any other kind of data recordable onto an optical recording medium, such as a CD, a DVD, a Blu-ray disc (BD), a High-Density DVD (HD-DVD), etc.

Figure 3:
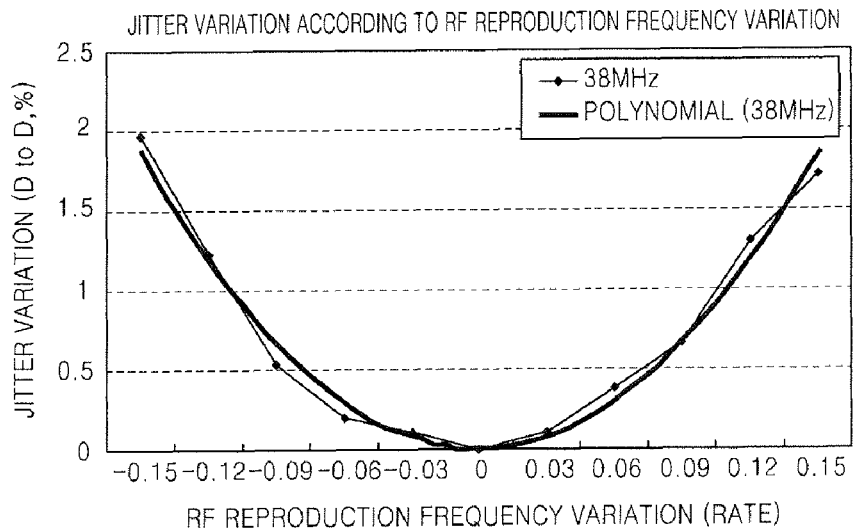
FIG. 3 is a graph illustrating the relationship between a signal quality variation and a reproduced frequency variation.

FIG. 3 is a graph illustrating the relationship between a signal quality variation and a reproduction frequency variation. Referring to FIG. 3, the graph illustrates a variation in jitter measured with a deviation of +15% and −15% based on a 38 MHz signal generated by the signal quality detection unit 254 in response to the reproduction frequency variation. The second-order polynomial expression is obtained by measuring jitter according to reproduction frequency variations at three points on the optical disk 20. The graph illustrated in FIG. 3 is represented by the following equation:

$$y = 83.0096x^2 - 0.0545x + 0.0002 \quad \text{[Equation 3]}$$

In FIG. 3, the X-axis represents the frequency variation of a reproduced RF signal and the Y-axis represents the jitter variation. When the jitter variation is determined according to the graph of FIG. 3 or Equation 3, the RF reproduction frequency variation can be obtained. When a difference between the reproduction frequency of the innermost region and the reproduction frequency of the outermost region of the optical disk 20 is, for example, a ratio of 2.4, the number of regions can be obtained according to Equation 2, setting the variable a (i.e., a difference between the reproduction frequencies at the innermost region and the outermost region of the optical disk 20) equal to 2.4. The reproduction frequency variation and the number of regions according to the jitter variation are represented in Table 2 as follows:

TABLE 2

| Jitter variation | Reproduction frequency deviation (x) | Number of regions |
| --- | --- | --- |
| 0.1% | 3.50% | 26 |
| 0.5% | 7.79% | 12 |
| 1.0% | 11.01% | 9 |

When the reproduction frequency of the innermost region is 78.48 Mbps and the jitter variation is restricted to 0.1%, the following Table 3 can be obtained. A boundary reproduction frequency is obtained according to the boundary reproduction frequency of Table 1.

TABLE 3

| Region number | Boundary reproduction frequency (Mbps) | Position of boundary | Cut-off frequency |
| --- | --- | --- | --- |
| 1 | 81.2268 | P_1 | F_1 |
| 2 | 84.0697 | P_2 | F_2 |
| ... | ... | ... | ... |
| 25 | 185.467 | P_25 | F_25 |
| 26 | | | F_26 |

When the jitter variation is restricted to 0.5%, the number of regions can be set to 12 according to Table 2, and the boundary reproduction frequency is as follows in Table 4:

TABLE 4

| Region number | Boundary reproduction frequency (Mbps) | Position of boundary | Cut-off frequency |
| --- | --- | --- | --- |
| 1 | 84.5936 | P_1 | F_1 |
| 2 | 91.1834 | P_2 | F_2 |
| ... | ... | ... | ... |
| 11 | 179.111 | P_11 | F_11 |
| 12 | | | F_12 |

When the jitter variation is restricted to 1.0%, both the number of regions and the number of cut-off frequencies can be set to 9 as follows in Table 5:

TABLE 5

| Region number | Boundary reproduction frequency (Mbps) | Position of boundary | Cut-off frequency |
| --- | --- | --- | --- |
| 1 | 87.1206 | P_1 | F_1 |
| 2 | 96.7126 | P_2 | F_2 |
| ... | ... | ... | ... |
| 8 | 181.99 | P_8 | F_8 |
| 9 | | | F_9 |

The cut-off frequencies can then be appropriately set for the respective regions using Tables 3, 4, and 5.

Figure 4:
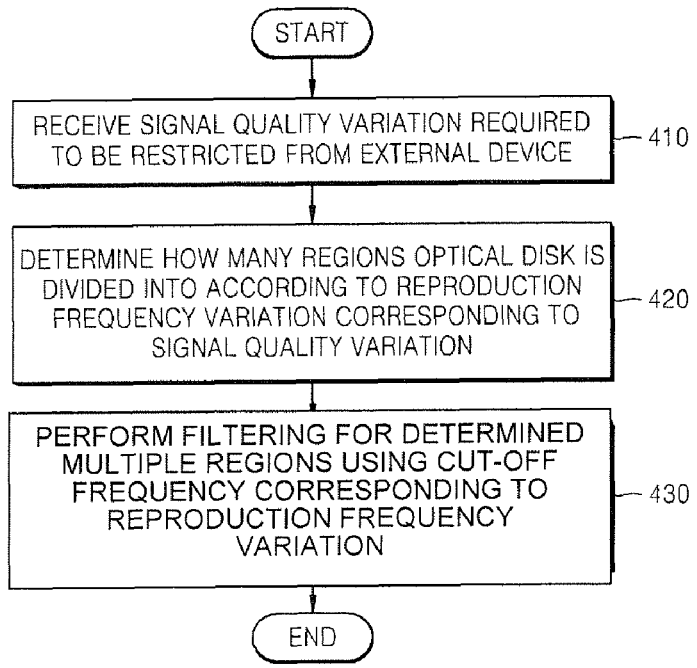
FIG. 4 is a flowchart illustrating an optical disk reproducing method according to an embodiment of the present invention.

FIG. 4 is a flowchart illustrating an optical disk reproducing method according to an embodiment of the present invention. Referring to FIG. 4, in operation 410, a signal quality variation which is required to be restricted is transmitted from the optical disk reproducing apparatus 200 or an external device and received by the controller 250. The signal quality variation may be various types, such as jitter or a bit error rate. The signal quality variation can be input to the controller 250 in various ways, such as manually by a user of the optical disk reproducing apparatus 200 or set in the optical disk reproducing apparatus 200 by a manufacturer. The signal quality variation is received by the controller 250 in order to obtain a reproduction frequency variation according to the signal quality variation. The reproduction frequency variation is in turn used to divide the optical disk 20 into a plurality of regions according to signal quality.

In operation 420, the region determination unit 256 determines how many regions the optical disk 20 is divided into according to a reproduction frequency variation corresponding to the signal quality variation. To determine the number of regions, the signal quality detection unit 254 first measures the signal quality variation corresponding to the reproduction frequency variation. Then, the determination unit 252 obtains the reproduction frequency variation corresponding to the signal quality variation required to be restricted, and the region determination unit 256 determines the number of regions of the optical disk is determined. The region determination unit 256 can determine the number of regions according to Equation 1 and Equation 2.

In operation 430, the equalizer 240 filters signals respectively picked up from the plurality of regions determined in operation 420 with cut-off frequencies corresponding to reproduction frequency variations of the respective regions. Since the respective regions have different signal qualities, the signals read from the respective regions should be filtered with cut-off frequencies corresponding to the different signal qualities. According to an aspect of the present invention, low pass filtering is carried out. However, it is understood that other types of filtering may instead be used, such as high-pass filtering, etc. The cut-off frequencies corresponding to reproduction frequency variations can have different respective values for each of the plurality of regions and have the same value at regions having similar reproduction frequency variations. For example, when non-neighboring regions, or regions that do not border each other, have the same reproduction frequency variation, signals picked up from these regions can be filtered with the same cut-off frequency. However, it is understood that the cut-off frequencies corresponding to reproduction frequency variations may have other values as well.

Figure 5:
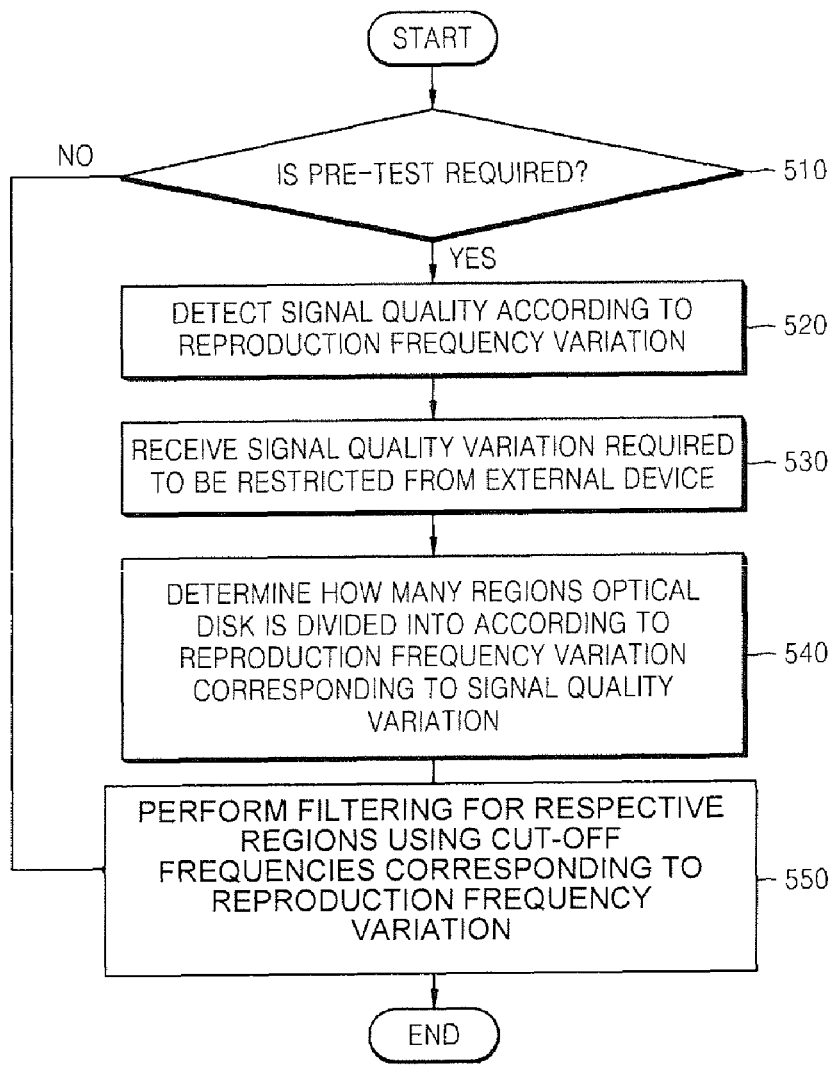
FIG. 5 is a flowchart illustrating an optical disk reproducing method according to another embodiment of the present invention.

FIG. 5 is a flowchart illustrating an optical disk reproducing method according to another embodiment of the present invention. Referring to FIG. 5, in operation 510, the determination unit 252 determines whether a pre-test is required before the optical disk 20 is reproduced. The pre-test is carried out in order to determine how many regions the optical disk 20 is divided into, the positions of the boundaries of the regions, and a cut-off frequency corresponding to each region. When a new optical disk 20 is inserted into the optical disk reproducing apparatus 200 or a user enters new settings to the optical disk reproducing apparatus 200, the pre-test should be performed. However, when the signal quality variation is changed in optical disks 20 of the same type, a previously stored test result (i.e., the previously stored relationship between the reproduction frequency variation and the signal quality variation) may be used, so that the pre-test is not required.

When the determination unit 252 determines that the pre-test is required in operation 510, the signal quality detection unit 254 detects signal quality according to the reproduction frequency variation in operation 520. To achieve this, the signal quality detection unit 254 measures qualities of signals respectively read from a plurality of positions on the optical disk 20. The measured signal qualities may include various types of qualities, such as, for example, jitter and bit error rate (BER). When the signal quality detection unit 254 measures the signal qualities, the signal quality detection unit 254 obtains, or generates, a polynomial expression with respect to the signal quality variation corresponding to the reproduction frequency variation. For example, when the signal quality detection unit 254 measures signal qualities at N+1 positions on the optical disk 20, the signal quality detection unit 254 obtains N-order polynomial expressions according to the measured signal qualities.

In operation 530, a signal quality variation required to be restricted is transmitted from an external device or the optical disk reproducing apparatus 200 and received by the controller 250. The signal quality variation can be input in various ways, such as, for example, manually by a user of the optical disk reproducing apparatus 200 or preset in the optical disk reproducing apparatus 200 by a manufacturer. As described above, the number of divided regions of the optical disk 20 depends on the signal quality variation required to be restricted. The number of regions decreases as the signal quality variation increases.

In operation 540, the region determination unit 256 determines how many regions the optical disk 20 should be divided into according to the reproduction frequency variation corresponding to the signal quality variation. When signal quality according to the reproduction frequency variation is detected in operation 520, the relationship between the reproduction frequency variation and the signal quality is obtained and the reproduction frequency variation corresponding to the signal quality variation required to be restricted, i.e., the restricted signal quality variation rate, is acquired. When the region determination unit 256 applies Equation 2 (above) to the obtained reproduction frequency variation, the region determination unit 256 determines the number of divided regions and detects the positions of the boundaries of the regions.

In operation 550, the equalizer 240 filters signals respectively read from the plurality of regions, which have different cut-off frequencies respectively corresponding to the regions. Since the respective regions have different signal qualities, the equalizer 240 filters the signals read from the respective regions with appropriate cut-off frequencies respectively corresponding to the signal qualities. Specifically, after the equalizer 240 filters a previous region, when the equalizer 240 reaches the boundary of the previous region and a following region, the cut-off frequency of the previous region of the two regions is changed to the cut-off frequency of the following region, and then the equalizer 240 performs the filtering of the following region. When the pre-test is not required in operation 510, the equalizer 240 performs the filtering operation in operation 550 without executing operations 520, 530 and 540.

Figure 6:
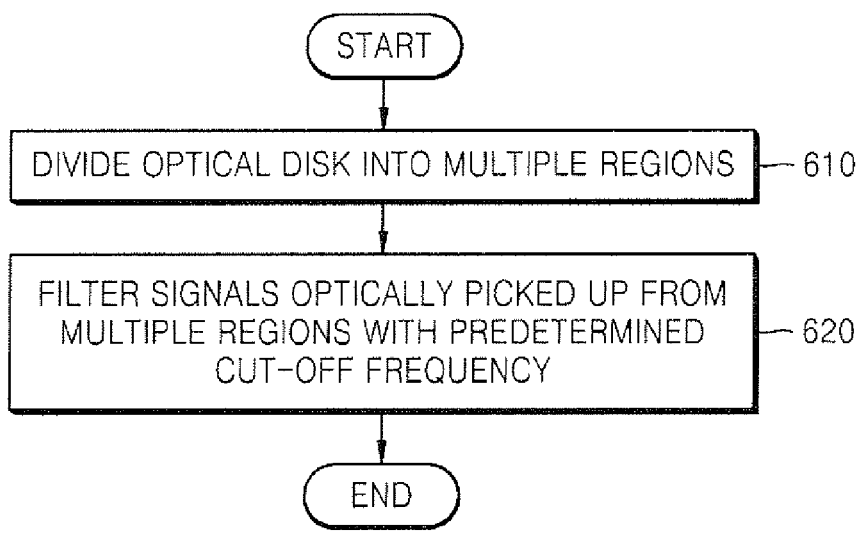
FIG. 6 is a flowchart illustrating an optical disk reproducing method according to yet another embodiment of the present invention.

FIG. 6 is a flowchart illustrating an optical disk reproducing method according to yet another embodiment of the present invention. Referring to FIG. 6, in operation 610, an optical disk 20 is divided into a plurality of regions. The optical disk 20 is divided according to a reproduction frequency variation. In operation 620, the equalizer 240 filters signals read from the plurality of divided regions, which have predetermined cut-off frequencies. According to an aspect of the present invention, neighboring regions have different cut-off frequencies. When the region determination unit 256 divides the optical disk 20 into the plurality of regions according to the reproduction frequency variation, neighboring regions have different reproduction frequency variations. Then, the equalizer 240 uses different cut-off frequencies to filter the RF signal.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

According to aspects of the present invention, the optical disk reproducing apparatus 200 and the methods shown in FIGS. 4, 5, and 6 and described above can be used to efficiently filter signals according to signal quality. Furthermore, signals read from regions of an optical disk 20 can be respectively filtered to prevent signal quality deviation and signal deterioration.

Although a few embodiments of the present invention have been shown and described, it would be appreciated by those skilled in the art that changes may be made in this embodi-

What is claimed is:

1. An optical disk reproducing apparatus to equalize and to reproduce signals optically read from an optical disk, the optical disk player comprising:
   a controller to determine a number of regions to divide the optical disk into according to a reproduction frequency variation corresponding to a restricted signal quality variation rate; and
   an equalizer to filter signals optically read from the divided regions using a cut-off frequency corresponding to the reproduction frequency variation.

2. The optical disk reproducing apparatus of claim 1, wherein the controller comprises:
   a signal quality detection unit to detect signal quality variation according to the reproduction frequency variation of the optical disk; and
   a region determination unit to receive the restricted signal quality variation rate which is transmitted from an external device and to determine the number of regions to divide the optical disk into according to the reproduction frequency variation corresponding to the restricted signal quality variation rate.

3. The optical disk reproducing apparatus of claim 2, wherein the signal quality detection unit detects a plurality of the signal quality variations respectively corresponding to a plurality of the reproduction frequency variations to obtain a polynomial expression with respect to the plurality of the signal quality variations corresponding to the plurality of the reproduction frequency variations.

4. The optical disk reproducing apparatus of claim 3, wherein the signal quality detection unit detects the signal quality variations respectively corresponding to N+1 of the reproduction frequency variations to obtain an N-order polynomial expression with respect to the signal quality variations corresponding to the reproduction frequency variations.

5. The optical disk reproducing apparatus of claim 3, wherein the signal quality detection unit detects the signal quality variations corresponding to the reproduction frequency variations by changing a signal reproducing point on the optical disk.

6. The optical disk reproducing apparatus of claim 3, wherein the signal quality detection unit detects the signal quality variations corresponding to the reproduction frequency variations by changing revolutions per minute (RPM) of a motor which rotates the optical disk.

7. The optical disk reproducing apparatus of claim 2, wherein the signal quality detection unit detects jitter or a bit error rate according to the reproduction frequency variation of the optical disk.

8. The optical disk reproducing apparatus of claim 7, wherein a variation in the jitter detected by the signal quality detection unit is proportional to the reproduction frequency variation of the optical disk.

9. The optical disk reproducing apparatus of claim 3, wherein the region determination unit determines the number of regions using the following equation:

$n = \log a \log(1+f)$ where n represents the number of regions, a represents a difference between reproduction frequencies at an innermost region and an outermost region of the optical disk, and f represents the reproduction frequency variation corresponding to the restricted signal quality variation rate, wherein f is determined using the polynomial expression.

10. The optical disk reproducing apparatus of claim 2, wherein the region determination unit determines the number of divided regions of the optical disk and positions of boundaries of the divided regions.

11. The optical disk reproducing apparatus of claim 2, wherein the controller further comprises a determination unit to determine whether the regions of the optical disk should be newly determined, and the signal quality detection unit and the region determination unit are operated according to the determination by the determination unit.

12. The optical disk reproducing apparatus of claim 1, wherein the cut-off frequency corresponding to the reproduction frequency variation has different values corresponding to the regions of the optical disk.

13. The optical disk reproducing apparatus of claim 1, wherein the cut-off frequency corresponding to the reproduction frequency variation has a same value for the regions of the optical disk having similar reproduction frequency variations.

14. The optical disk reproducing apparatus of claim 13, wherein the regions having the similar reproduction frequency variations do not border each other.

15. The optical disk reproducing apparatus of claim 1, wherein the equalizer low-pass-filters the signals.

16. An optical disk reproducing method to equalize and to reproduce signals optically read from an optical disk, the optical disk reproducing method comprising:
   determining a number of regions to divide the optical disk into based on a reproduction frequency variation corresponding to a restricted signal quality variation rate; and
   filtering signals optically read from the divided regions using a cut-off frequency corresponding to the reproduction frequency variation.

17. The optical disk reproducing method of claim 16, further comprising detecting signal quality variation according to the reproduction frequency variation of the optical disk before the determining of the number of divided regions of the optical disk.

18. The optical disk reproducing method of claim 17, wherein the detecting of the signal quality variation comprises detecting a plurality of the signal quality variations respectively corresponding to a plurality of the reproduction frequency variations to obtain a polynomial expression with respect to the signal quality variations corresponding to the reproduction frequency variations.

19. The optical disk reproducing method of claim 18, wherein the detecting of the signal quality variation comprises detecting the signal quality variations respectively corresponding to N+1 of the reproduction frequency variations to obtain an N-order polynomial expression with respect to the signal quality variations corresponding to the reproduction frequency variations.

20. The optical disk reproducing method of claim 18, wherein the detecting of the signal quality variation comprises detecting the signal quality variations corresponding to the reproduction frequency variations by changing a signal reproducing point on the optical disk.

21. The optical disk reproducing method of claim 18, wherein the detecting of the signal quality comprises detecting the signal quality variations corresponding to the reproduction frequency variations by changing revolutions per minute (RPM) of a motor which rotates the optical disk.

22. The optical disk reproducing method of claim 17, wherein the detecting of the signal quality comprises detecting jitter or a bit error rate (BER) according to the reproduction frequency variation of the optical disk.

23. The optical disk reproducing method of claim 22, wherein a variation in the detected jitter is proportional to the reproduction frequency variation of the optical disk.

24. The optical disk reproducing method of claim 18, wherein the determining of the number of divided regions of the optical disk comprises determining the number of regions using the following equation:

$$n = \log a \log(1+f)$$

where n represents the number of regions, a represents a difference between reproduction frequencies at an innermost region and an outermost region of the optical disk, and f represents the reproduction frequency variation corresponding to the restricted signal quality variation rate, wherein f is determined using the polynomial expression.

25. The optical disk reproducing method of claim 17, wherein the determining of the number of divided regions comprises determining the number of divided regions of the optical disk and positions of boundaries of the divided regions.

26. The optical disk reproducing method of claim 17, further comprising determining whether new regions of the optical disk from which signals are read and filtered with different cut-off frequencies should be determined, and performing the detecting of the signal quality variation and the determining of the number of divided regions according to the determining of whether the new regions should be determined.

27. The optical disk reproducing method of claim 16, wherein the cut-off frequency corresponding to the reproduction frequency deviation has different values corresponding to the divided regions of the optical disk.

28. The optical disk reproducing method of claim 16, wherein the cut-off frequency corresponding to the reproduction frequency variation has a same value for regions having similar reproduction frequency variations from among the divided regions of the optical disk.

29. The optical disk reproducing method of claim 28, wherein the regions having similar reproduction frequency variations do not border each other.

30. The optical disk reproducing method of claim 16, wherein the filtering of the signals comprises respectively low-pass-filtering the signals.

31. The optical disk reproducing apparatus of claim 1, wherein the cut-off frequencies are different for bordering regions among the plurality of regions.

32. The optical disk reproducing method of claim 16, wherein the predetermined cut-off frequencies are different for bordering regions among the plurality of regions.

33. The optical disk reproducing apparatus of claim 1, wherein the restricted signal quality variation rate comprises a maximum signal quality variation rate allowable during reproduction of RF signals from the optical disk.

34. The optical disk reproducing apparatus of claim 33, wherein the controller comprises:
a signal quality detection unit to detect signal quality variation according to reproduction frequency variation of the optical disk and to generate a polynomial expression relating the detected signal quality variation to the reproduction frequency variation; and
a region determination unit to receive the maximum signal quality variation rate and to use the generated polynomial to determine the number of regions according to the reproduction frequency variation based on the maximum signal quality variation rate.

35. The optical disk reproducing method of claim 16, wherein the restricted signal quality variation rate comprises a maximum signal quality variation rate allowable during reproduction of RF signals from the optical disk.

36. The optical disk reproducing method of claim 35, further comprising:
detecting signal quality variation according to reproduction frequency variation of the optical disk;
generating a polynomial expression relating the detected signal quality variation to the reproduction frequency variation;
receiving the maximum signal quality variation rate; and
using the generated polynomial to determine the number of regions according to the reproduction frequency variation based on the maximum signal quality variation rate.

37. The optical disk reproducing method of claim 36, wherein the receiving of the maximum signal quality variation rate comprises receiving a maximum allowable amount of jitter variation.

38. The optical disk reproducing method of claim 37, wherein the generating of the polynomial comprises generating values of the jitter variation which are proportional to corresponding values of the reproduction frequency variation.

* * * * *